(12) United States Patent
Farley et al.

(10) Patent No.: US 7,677,965 B2
(45) Date of Patent: Mar. 16, 2010

(54) COMBINE HARVESTER RESIDUE CHOPPER ACTIVE COUNTER KNIFE ASSEMBLY

(75) Inventors: Herbert M. Farley, Elizabethtown, PA (US); Nathan E. Isaac, Leola, PA (US); Troy C. Robl, Manhattan, KS (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/287,288

(22) Filed: Oct. 8, 2008

(65) Prior Publication Data
US 2009/0111549 A1 Apr. 30, 2009

Related U.S. Application Data

(62) Division of application No. 11/978,279, filed on Oct. 29, 2007, now Pat. No. 7,510,472.

(51) Int. Cl.
*A01F 12/40* (2006.01)
(52) U.S. Cl. .................................................. 460/112
(58) Field of Classification Search ............. 460/111, 460/112, 901; 56/504, 294, 341; 241/32, 241/166, 243, 292
See application file for complete search history.

(56) References Cited

U.S. PATENT DOCUMENTS

| | | | | |
|---|---|---|---|---|
| 2,842,175 | A * | 7/1958 | Thompson | 241/243 |
| 3,380,502 | A * | 4/1968 | Gronberg | 241/224 |
| 3,874,604 | A * | 4/1975 | Gronberg et al. | 241/243 |
| 4,077,573 | A * | 3/1978 | Kersey et al. | 241/32 |
| 4,612,941 | A * | 9/1986 | Kunde | 460/112 |
| 5,161,356 | A | 11/1992 | Pick | 56/60 |
| 5,269,126 | A | 12/1993 | Kalverkamp | 56/60 |
| 5,503,339 | A * | 4/1996 | Doppstadt | 241/166 |
| 5,542,883 | A * | 8/1996 | Cruson | 460/112 |
| 5,769,711 | A | 6/1998 | Roberg | 460/73 |
| 5,833,533 | A | 11/1998 | Roberg | 460/112 |
| 5,974,776 | A | 11/1999 | Prellwitz | 56/504 |
| 6,055,799 | A | 5/2000 | Savoie et al. | 56/16.4 |

(Continued)

*Primary Examiner*—Árpád Fábián-Kovács
(74) *Attorney, Agent, or Firm*—Michael G. Harms; John William Stader; Patrick M. Sheldrake (57) ABSTRACT

An active counter knife assembly for a material chopper assembly or construction that has a rotary chopper element disposed across a material flow path, including a chopper grate assembly, having a grate portion with spaced generally transverse slots therealong, positionable generally parallel to the rotary chopper element of the residue chopper assembly; a rotatable shaft positionable generally beneath and parallel to the grate portion of the chopper grate assembly, with a plurality of fixed or flail-type knife elements attached to such shaft and positioned thereon to be alignably rotatable through the spaced generally transverse slots of the grate portion of the chopper grate assembly; and a drive mechanism for effecting rotational movement of the counter knife assembly, which drive mechanism is preferably controllable to allow an operator to vary the rotational speed and direction of the rotatable shaft so that the rotatable shaft may be selectably either maintained in an essentially fixed or locked condition or operated to rotate either counter to the rotation of the rotary chopper element of the chopper assembly or in the same tangential direction as the rotary chopper element, thereby controlling to some extent both the throughput speed of the material at the chopper assembly and the quality of the chop by the chopper assembly.

1 Claim, 8 Drawing Sheets

U.S. PATENT DOCUMENTS 6,120,373 A * 9/2000 Schrattenecker ............ 460/112
6,152,820 A 11/2000 Heidjann et al. ............ 460/112
6,354,938 B1 3/2002 Schrattenecker ............ 460/112
6,594,983 B1 7/2003 Krone et al. ................. 56/341
6,699,121 B2 3/2004 Bognar et al. ............... 460/112

* cited by examiner

COMBINE HARVESTER RESIDUE CHOPPER ACTIVE COUNTER KNIFE ASSEMBLY

This divisional application claims priority under 35 U.S.C. §120 from U.S. patent application Ser. No. 11/978,279 filed on Oct. 29, 2007 now U.S. Pat. No. 7,510,472 by Herbert M. Farley, Nathan E. Isaac and Troy C. Robl with the same title, the full disclosure of which is hereby incorporated by reference.

TECHNICAL FIELD

This invention relates generally to agricultural harvesting combines and machines and to straw and residue choppers therewith, especially residue chopper assemblies that have a rotary chopper element and an associated counter knife assembly positioned generally parallel thereto, and more particularly to an active counter knife assembly that can be employed in place of the stationary knife assemblies previously utilized with residue choppers and which is operable to minimize or better clear residue buildup, to better control the throughput speed of the crop residue at the residue chopper assembly and the speed of the residue flow from the residue chopper assembly towards the rear of the combine, and to better control the quality of the chop by the residue chopper assembly. Significantly, the counter knife assembly of the present invention includes an active element, generally in the form of a rotatable shaft that includes a plurality of knife blades or elements mounted thereon and positionable beneath a chopper grate assembly with longitudinally spaced transverse slots therealong, and a drive mechanism operable to drive the active element, such as by rotating the rotatable shaft to rotatably move the knife blades or elements on the rotatable shaft through the slots of the chopper grate, to chop the crop residue passing between the rotary chopper element and the counter knife assembly and to propel the chopped crop residue therefrom.

BACKGROUND ART

Straw and residue choppers or chopper assemblies have long been in use in or with agricultural combines for chopping into finer pieces for subsequent distribution over a field the crop residue, also referred to as material other than grain (MOG), resulting from a harvesting operation. Such residue chopper assemblies have typically included a rotary chopper element disposed laterally within a housing extending generally horizontally across the flow path of the crop residue through the housing as well as a counter knife assembly extending generally parallel to and spaced from the rotary chopper element, which counter knife assembly has included a chopper grate assembly spaced below and extending generally parallel to the rotary chopper element and a knife mounting assembly positioned generally beneath the chopper grate assembly.

The rotary chopper element of the residue chopper assembly has typically had associated therewith about its periphery a number of knife blades or paddles and has included a cylindrical tube or like member having a plurality of mounting locations distributed about its periphery, at which locations the various knife blades or paddles could be mounted or affixed.

The chopper grate assembly has included a grate portion having a plurality of holes or transverse slots spaced along its length, which holes or transverse slots have typically been so sized that smaller pieces of crop residue, which may include un-separated grain, have been able to pass therethrough and enter the combine cleaning system, at least when such holes or slots have not had other elements positioned therein or extending therethrough or have not otherwise been obstructed.

The knife mounting assemblies of such prior art constructions have typically included bar-like elements extending in a fixed end-to-end arrangement with a plurality of spaced blade elements along the portion of the bar-like element generally facing the rotary chopper element, which blade elements have been aligned with slots in the grate portion of the chopper grate assembly. Such blade elements and slots in the grate portion of the chopper grate assembly have been coordinately sized and configured to permit the blade elements to be insertable into the slots to at least partially project therethrough when the knife mounting assembly is disposed in certain positions.

The knife blades or paddles of the rotary chopper element have cooperated with the blade elements of the knife mounting assembly when the knife mounting assembly is positioned such that the blade elements thereof project through the slots in the grate portion of the chopper grate assembly to chop the crop residue as it passes between the rotary chopper element and the chopper grate assembly.

Often, the counter knife assembly may have had associated therewith an adjustment mechanism that was operable to vary the spacing between the grate portion of the chopper grate assembly and the knife mounting assembly and the degree of projection of the blade elements of the knife mounting assembly through the slots of the grate portion, as may have been desirable depending upon the crop being harvested. Such an adjustment mechanism operated to move the knife mounting assembly between a fully engaged position with the blade elements of the knife mounting assembly extending through the slots towards the rotary chopper element and a fully retracted position in which the blade elements are fully withdrawn or retracted from the slots, and was typically also operable to adjustably vary the position between a fully engaged and fully retracted position.

A counter knife assembly of such general construction, whether or not the knife mounting assembly thereof has been adjustably repositionable relative to the grate portion by an adjustment mechanism, has often been referred to as a stationary knife assembly since the knife mounting assembly thereof, though perhaps adjustable to some extent to vary the distance between the rotary chopper element and the knife mounting assembly, such as by movement of the knife mounting assembly relative to the grate portion of the chopper grate assembly and the slots thereof, often in an arc-like movement about an offset axis parallel to both the rotary chopper element and the axis of the knife assembly mounting, is not rotatable about its own axis and the mounted knife blades or elements, once the knife mounting assembly has been adjustably moved to a given position, remain in essentially fixed or stationary positions during the chopping operation of the residue chopper assembly.

As noted, residue chopper assemblies employing such stationary knife assemblies have long been in use in or with agricultural combines. In the operation of a typical combine that employs a threshing rotor, the flow of crop residue or MOG remaining after threshing is typically discharged into a crop residue treatment and distribution system located below and rearwardly of the rear end of the threshing system, which crop residue treatment and distribution system typically includes a primary rotary chopper or beater apparatus or assembly that chops or beats the residue into smaller pieces and propels the resultant crop residue further rearwardly within a rear end of the combine for either discharge from the combine through a rear opening onto a field, or into another secondary chopper and/or spreader mounted on the rear end operable for spreading the residue over a swath of a field.

During a typical operation of the combine, as the crop residue is discharged from the combine rotor and moves through the crop residue treatment and distribution system it flows between the rotary chopper element of the primary chopper and the chopper grate assembly thereof. When the stationary knife assembly is in an engaged position, the crop residue is chopped into smaller pieces by the cooperative action of the knife blades or elements of the stationary knife assembly and the knife blades or paddles on the rotating rotary chopper element. The rotational movement of the rotary chopper element not only effects a cutting of the material encountered by the knife blades or paddles associated therewith but also serves to propel the resultant flow of crop residue further rearwardly.

When the stationary knife assembly is positioned to a fully retracted position, however, such as might be desirable with some crops, the crop residue passing between the rotary chopper element and the chopper grate assembly falls upon the grate portion of the chopper grate assembly, with some of the smaller crop residue pieces, including some remaining unseparated grain, falling through the slots thereof. Some of such crop residue accumulates over time on the retracted knife mounting assembly or in or at the slots of the grate portion of the chopper grate assembly and interferes with or prevents the subsequent re-engagement of the stationary knife assembly for effective chopping. When the crop residue build-up becomes significant, it does not allow the combine operator to easily engage the blade elements of the knife mounting assembly with the slots of the grate portion of the chopper grate assembly, absent removal of the build-up. Generally, removal of such build-up has had to be effected manually, resulting in additional servicing time and increased possibility of operator injury by the blade elements of the stationary knife assembly.

Foregoing the removal of the build-up and attempting to continue operation, especially over an extended period, with the stationary knife assembly in a retracted position is not generally a viable option since the rotary chopper element, by itself, due to the mechanical composition of the system, is sometimes, particularly with heavier crops or in circumstances where a heavy flow of crop residue is being introduced into the chopper assembly, not able to achieve a fast enough rotational speed to adequately desirably chop the crop residue. The chopper assembly needs to operate at an optimized throughput speed, generally as fast as possible within the limitations of the system, in order to properly chop the crop residue and to propel it rearwardly for spreading. The rotational speed realizable by the rotary chopper element is sometimes, if not often, inadequate to effect the desired chopping and throughput of the crop residue if the stationary knife assembly remains retracted or obstructed.

Consequently, users have continued to seek residue chopper assemblies that may be adjustably operated to address the various issues noted hereinabove without the necessity for frequent down time to remove accumulated crop residue build-up from stationary knife assemblies and/or grate portions of chopper grate assemblies and without the need to deal with the accompanying safety hazards. The present invention, as discussed and described hereinafter, addresses such a construction and its use.

SUMMARY OF THE INVENTION

What is disclosed is an active counter knife assembly for a material chopper assembly or construction, hereinafter often referred to more simply as a chopper, such as a crop residue chopper, and a method of use thereof, that achieves the advantages sought therefor while overcoming various problems associated with the use of the known stationary knife assemblies in previous residue chopper assemblies and constructions. Such active counter knife assembly includes a chopper grate assembly, having a grate portion with spaced generally transverse slots therealong, positionable generally parallel to a rotary chopper element of the residue chopper assembly; a rotatable shaft positionable generally beneath and parallel to the grate portion of the chopper grate assembly, with a plurality of fixed or flail-type knife elements attached to such shaft and positioned thereon to be alignably rotatable through the spaced generally transverse slots of the grate portion of the chopper grate assembly; and a drive mechanism for effecting rotational movement of the counter knife assembly.

Preferably, the drive mechanism is controllable to allow an operator to vary the rotational speed and direction of the rotatable shaft. In such regard, if a user desires to utilize the active counter knife assembly in a stationary mode as essentially a stationary knife assembly, the rotatable shaft may be maintained in an essentially fixed or locked condition. On the other hand, if the user desires to utilize the active counter knife assembly in its active mode, the rotatable shaft may be operated to rotate either counter to the rotation of the rotary chopper element of the chopper assembly or in the same tangential direction as the rotary chopper element. By selectably determining whether the rotatable shaft is held fixed or not, and by selectably determining the direction and speed of rotation when the rotatable shaft is not to be held fixed, the user can thus control to some extent both the throughput speed of the crop residue at the residue chopper assembly, as well as the corresponding speed of the residue flow from the residue chopper assembly towards the rear of the combine, and the quality of the chop of the crop residue chopper assembly.

Optionally, an adjustment mechanism may be provided and employed to adjustably vary the positioning of the rotatable shaft relative to the grate portion of the chopper grate assembly between a fully engaged position wherein the knife elements of the counter knife assembly alignedly rotate through the slots in the grate portion of the chopper grate assembly at maximal projection and a fully retracted position wherein the knife elements project minimally, if at all, through the slots, thereby controlling to some extent the chop quality of the residue chopper assembly.

Such counter knife assembly is especially useful with residue choppers for agricultural combines and like equipment, including combines that include an axially arranged threshing system having at least one rotor rotatable within a concave for moving crop residue along an internal rotor residue passage and discharging a flow of crop residue into and through a rearwardly located, generally downwardly facing discharge passage to a crop residue treatment and distribution system that includes the residue chopper assembly, but is not limited to use in such systems or applications.

In such agricultural systems and applications, however, the typical residue chopper assembly with which the active counter knife assembly may be employed will include a housing with a rotary chopper element disposed laterally within the housing extending generally horizontally across the flow path of the crop residue through the housing, which rotary chopper element has associated therewith about its periphery a number of knife blades or paddles.

In various of its many possible forms, the active counter knife assembly of the present invention includes a chopper grate assembly similar to the chopper grate assemblies of previous stationary knife assemblies, with a grate portion, having a plurality of spaced generally transverse slots therealong, positioned generally parallel to the rotary chopper element to define a crop residue flow passage between the rotary chopper element and the grate portion. In one preferred form of the invention, the grate portion extends between opposed sides of the chopper grate assembly, and a rotatable shaft having first and second ends is positioned beneath and generally parallel to the grate portion and the slots thereof and rotatably mounted at or to the opposed sides of the chopper grate assembly at a fixed location, with a plurality of fixed or flail-type knife elements disposed about the surface of the rotatable shaft. The slots in the grate portion and the knife elements about the surface of the rotatable shaft are coordinately sized and positioned relative to one another to permit the knife elements to project and pass through the slots of the grate portion as the rotatable shaft is rotated about its axis. A drive mechanism is operatively connected to the rotatable shaft to rotatably drive the rotatable shaft during a chopping operation. Such drive mechanism will preferably be a variable speed drive, and may optionally include, by way of example and not of limitation, a hydraulic motor, a mechanical drive, an electric motor, or other device or assemblage suitable for the intended purpose.

As crop residue is introduced into the chopper assembly, such residue passes between the rotary chopper element and the chopper grate assembly. If the drive mechanism holds the rotatable shaft fixed and non-rotating, the active counter knife assembly may function much as if it were a stationary knife assembly, especially if the rotatable shaft is in a position with knife elements on the rotatable element projecting through slots along the grate portion of the chopper grate assembly.

If the drive mechanism is operated to counter-rotate the rotatable shaft relative to the rotary chopper element, however, the relative speed difference between the knife blades of the rotary chopper element and the knife elements of the counter knife assembly will be greater than if the counter knife assembly were a stationary knife assembly, and a finer chop of the crop residue will typically be achieved. Such operation, which may be found desirable with lighter crops and crop residue flows or when throughput and expulsion from the chopper assembly is not an issue, is, because of the active, rotational movement of the knife elements of the rotatable shaft through the slots in the grate portion of the chopper grate assembly, somewhat self-cleaning and resistant to residue build-up that might otherwise clog the slots or become attached to components.

On the other hand, if the drive mechanism is operated to rotate the rotatable shaft in the same tangential direction as the rotary chopper element, the relative speed difference between the knife blades of the rotary chopper element and the knife elements of the counter knife assembly will be less than if the counter knife assembly were a stationary knife assembly, and a courser chop will typically result. If the rotatable shaft is caused to rotate such that the linear tip speed is the same speed as the rotary chopper element and in the same tangential direction, the linear tip speed differential between the knife blades of the rotary chopper element and the knife elements of the counter knife assembly will be essentially zero, as a consequence of which the crop residue will generally be more rapidly propelled through the passageway between the rotary chopper element and the chopper grate assembly, but with minimal chopping by the chopper assembly.

Rotating the rotatable shaft in the same tangential direction as the rotary chopper element will typically be more desirable with heavier crops or greater crop residue flows or when higher throughput is necessary or a courser output residue is desired. For much the same reasons as with counter-rotation of the rotatable shaft, the active, rotational movement of the knife elements of the rotatable shaft through the slots in the grate portion of the chopper grate assembly will generally effect a self-cleaning of the counter knife assembly and its components and tend to minimize the residue build-up that might otherwise clog the slots or become attached to components.

Depending upon the characteristics of the particular systems and components utilized, as well as the crop being harvested and other harvesting conditions, the speed and direction of rotation of the rotatable shaft may thus be varied or adjusted to effect an optimal chopping operation. Such adjustment may be effected either before or during the course of a harvesting operation, and reverse operations of the rotatable shaft at other times may be desirable for self-cleaning purposes and to assist in breaking up or breaking free residue build-up that may have occurred within the slots of the grate portion or at other locations during a previous chopping operation under a given counter knife assembly setup.

In another preferred embodiment, the rotatable shaft, instead of being mounted at or to the opposed sides of the chopper grate assembly at a fixed location, is so mounted as to be generally beneath and parallel to the grate portion and the slots thereof, but adjustably movable towards or away from the grate portion so that the degree to which the knife elements project through the slots in the grate portion of the chopper grate assembly may be selectably varied. An adjustment mechanism similar to that employed with previous stationary knife assemblies can be similarly utilized with such embodiment. In accordance therewith, and by way of example only and not of limitation, the first and second ends of the rotatable shaft may be rotatably connected to respective first and second end plates, and such end plates may be attached to the opposed sides of the chopper grate assembly by swivel connections at swivel connection points offset from the axis of rotation of the rotatable shaft, which swivel connection points define a rotation axis for the end plates and the rotatable shaft connected to such end plates, defined as the engagement positioning axis, that is generally parallel to both the rotary chopper element and the rotatable shaft. A positioning rod or other control member is connected to at least one of the end plates to effect a swivel movement of the end plates about the engagement positioning axis, the operation of which positioning rod may be controlled by a manual lever-type construction or by other suitable devices and constructions, including systems that may be remotely operable or controllable by an operator.

Such active counter knife assembly embodiment can be employed in much the same manners and for much the same purposes and with much the same results as the other embodiment discussed hereinabove, but, in addition, with this latter embodiment, the rotatable shaft can be selectably positioned to be closer to or farther from the grate portion of the chopper grate assembly, as a consequence of which the amount by which the knife elements of the rotatable shaft project and rotate through the slots of the grate portion can be varied and controlled. Such additional adjustability permits a user to exercise still further control over the chop quality and the throughput and speed of expulsion of the crop residue from the chopper.

The active counter knife assembly of the present invention, in various embodiments, can thus be effectively employed in residue chopper assemblies, and in lieu of the stationary knife mounting assemblies of previous constructions, to better control, to some extent, both the throughput speed of the crop residue at the residue chopper assembly and the speed of the residue flow from the residue chopper assembly towards the rear of the combine, and to also better control, to some extent, the chop quality of the residue chopper assembly.

DETAILED DESCRIPTION OF THE INVENTION

Figure 1:
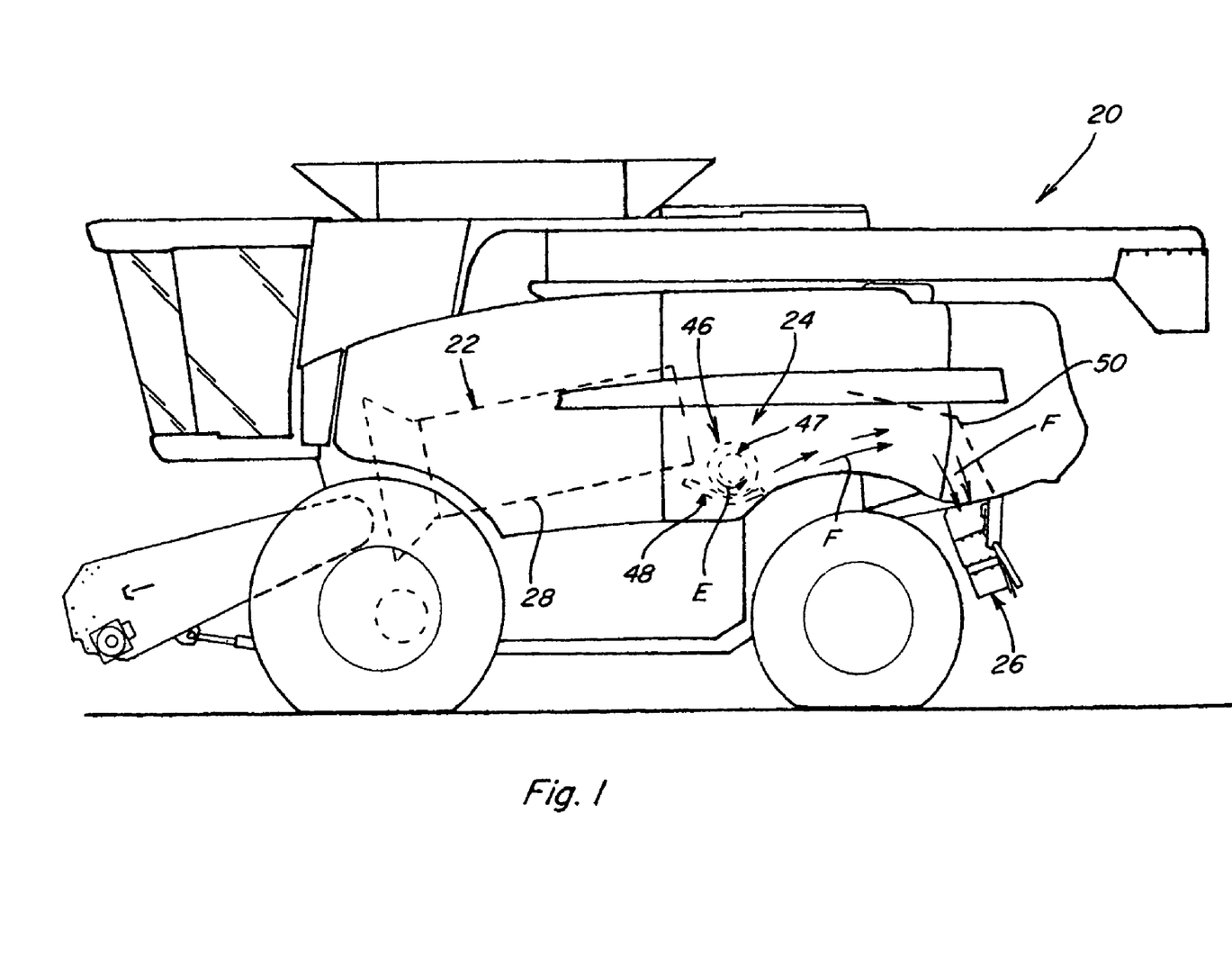
FIG. 1 is simplified side plan view, from the left side, of an agricultural combine, illustrating, in dotted outline, an axially arranged threshing system of the combine and a chopper assembly of the residue treatment and distribution system of the combine.
Figure 2:
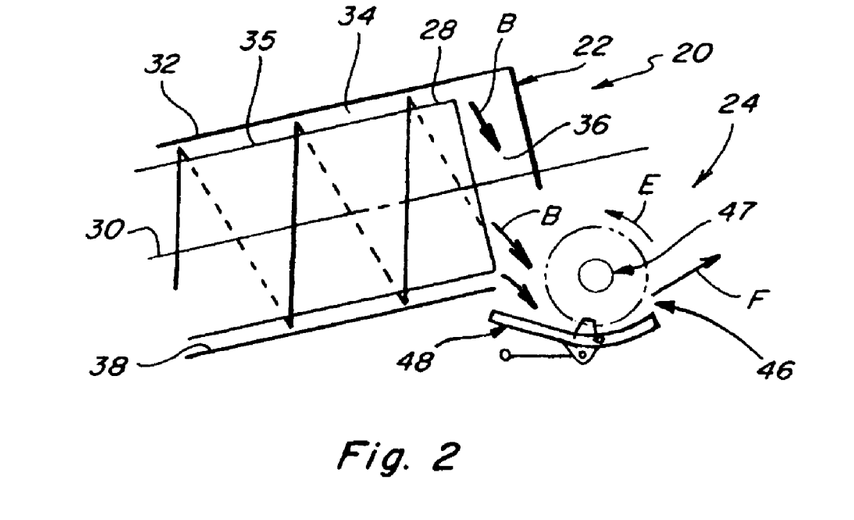
FIG. 2 is a simplified side plan view, from the left side, of the threshing system and a portion of the crop residue treatment and distribution system of the combine of FIG. 1, further illustrating the flow of crop residue to and through the chopper assembly.

Referring now to the drawings, wherein preferred embodiments of the present invention are shown, wherein like numerals refer to like term, and wherein certain elements and features may be labeled or marked on a representative basis without each like element or feature necessarily being individually shown, labeled, or marked, FIGS. 1 and 2 depict a representative agricultural combine 20 that includes an axially arranged threshing system 22 and a crop residue treatment and distribution system 24 with a crop residue spreader 26, all of well known construction and operation.

As can be generally and essentially observed from a review and study of FIGS. 1-2, threshing system 22 is axially arranged in that it includes a cylindrical rotor 28 conventionally supported and rotatable in a predetermined, typically clockwise direction, about a rotational axis 30 therethrough and within a concave 32 (FIG. 2), for conveying a flow of crop material in a helical flow path through a space 34 extending circumferentially around an outer cylindrical surface 35 of rotor 28 and an inner circumferential surface 38 of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred rpm and over a thousand rpm Wheat and other small grains will typically have relatively small crop residue components, whereas other grains, such as corn, will typically have larger components, such as thick stalk segments, cob fragments, and large leaves.

Crop residue treatment and distribution system 24 will typically include a rotary device, such as a chopper assembly 46, having a rotary chopper element 47 rotatable in a direction E above a concave pan assembly such as chopper grate assembly 48. Rotary chopper element 47 typically rotates at a rapid speed, so as to be capable of accelerating and propelling a flow of crop residue rearwardly within the confines of the rear end of combine 20, as generally denoted by arrows F. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

Figure 3:
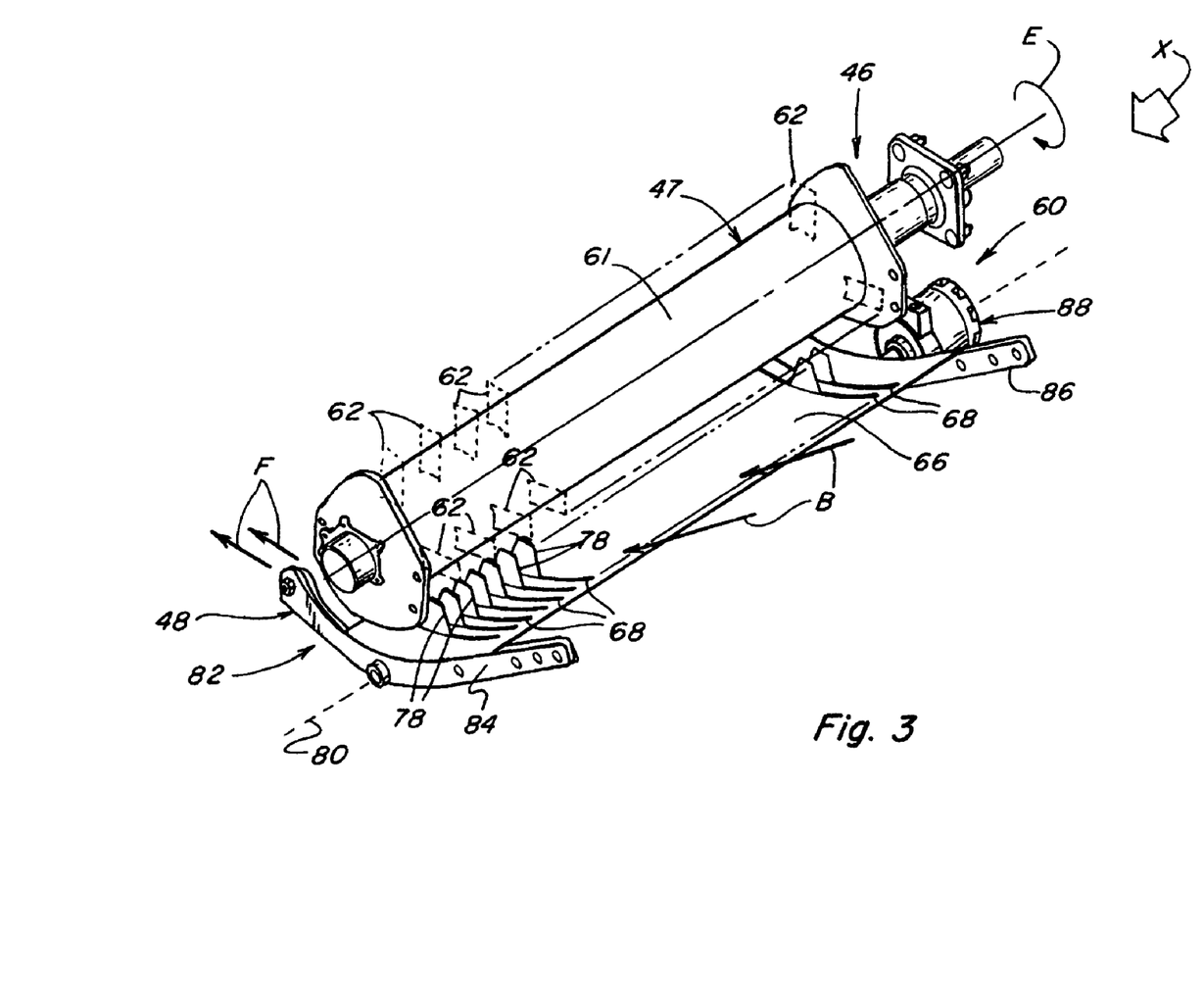
FIG. 3 is a perspective view, from the right front side of a chopper assembly, depicting one preferred embodiment of an active counter knife assembly according to the present invention, wherein, for purposes of clarity, knife blades on the rotary chopper element of the chopper assembly are shown in dotted outline only and phantom lines along the central portions of the rotary chopper element and the grate assembly should be considered to include therealong various components, representative components of which are depicted to the outer sides thereof.

FIG. 3 depicts generally a portion of a chopper assembly 46 that includes an active counter knife assembly 60 according to the present invention in conjunction with a rotary chopper element 47 that extends generally horizontally across the flow path of the crop residue above chopper grate assembly 48. The rotary chopper element 47 includes a cylindrical tube 61, or like member, and has a number of knife blades or paddles 62 mounted or affixed thereto at a plurality of mounting locations distributed about its periphery. The exact form and configuration of such mounted or attached knife blades or elements is not considered critical to the present invention. Although the knife blades or elements 62 are shown generally mounted in rows and columns in FIG. 3, they need not be arranged in such a fashion and could be as readily mounted in a staggered or helical or other arrangement.

Chopper grate assembly 48 includes a grate portion 66 that extends generally parallel to the rotary chopper element 47 with a plurality of spaced slots 68 therealong, the purpose and configurations of which slots 68 will be further addressed hereinafter. For purposes of clarity, not all of the slots, including especially a plurality of slots along the phantom line in the central portion of the grate portion 66, are depicted in FIG. 3. Rotary chopper element 47 and grate portion 66 define a passageway 70 therebetween, as better observed from FIG. 4, for the crop residue that is directed to the chopper assembly 46 for treatment thereby, such as crop residue flow B from the threshing system 22. Slots 68 in grate portion 66 extend generally transversely across such grate portion, in the direction of the crop residue flow.

Figure 4:
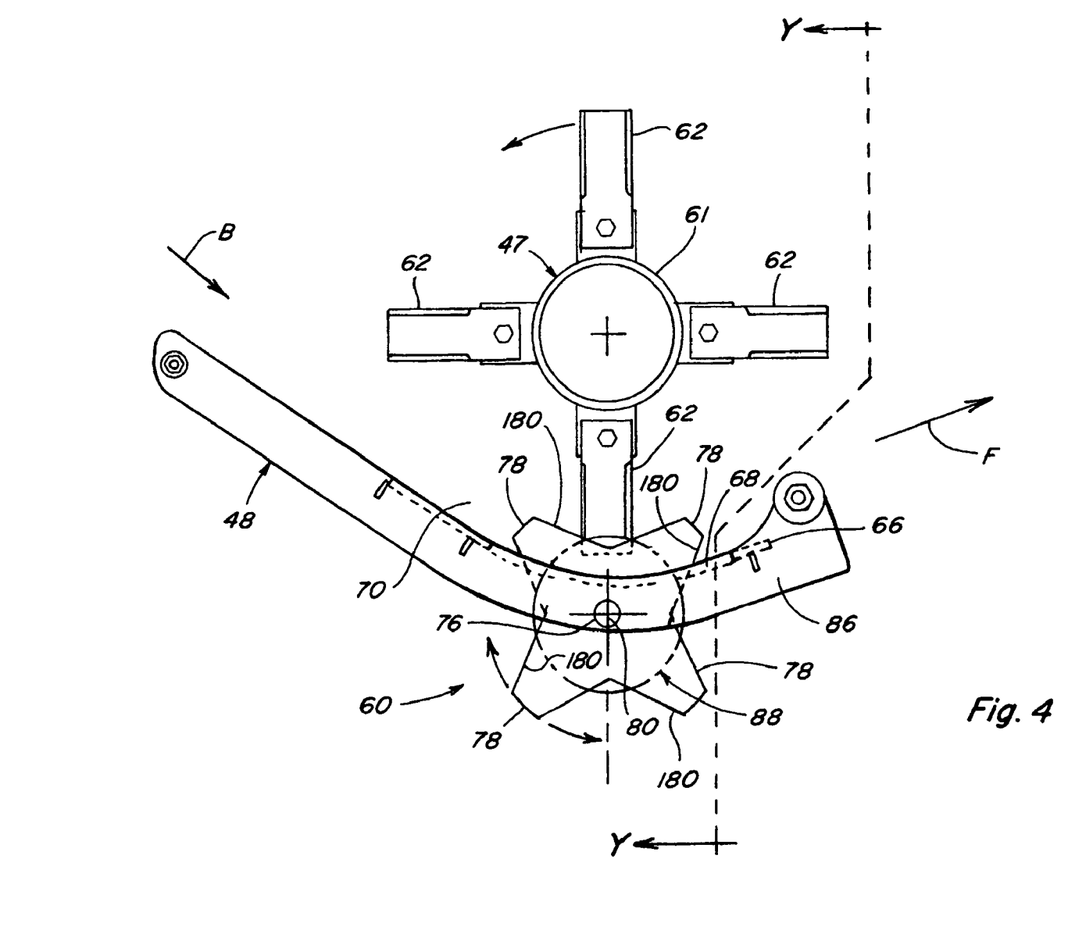
FIG. 4 is a simplified left side plan view, generally viewed from position X in FIG. 3, of a portion of the chopper assembly of FIG. 3 with the active counter knife assembly thereof, wherein, for purposes of clarity, the drive motor in the foreground is shown in phantom only.

With reference, now, to both FIGS. 3 and 4, counter knife assembly 60 includes a rotatable shaft 76 positioned generally beneath and parallel to both rotary chopper element 47 and grate portion 66, having a plurality of knife elements 78 mounted thereon. Rotatable shaft 76 is rotatable about an axis of rotation 80 therethrough, defined and referred to as the rotatable shaft axis or the shaft rotation axis, to effect movement of the knife elements 78 relative to grate portion 66. Such knife elements 78 are mounted at positions on rotatable shaft 76 generally alignable with slots 68 in grate portion 66 as the rotatable shaft 76 is rotated about its rotatable shaft axis 80, and slots 68 and knife elements 78 are coordinately sized and configured to permit the knife elements 78 to be movable through slots 68 as rotatable shaft 76 is rotated about its rotatable shaft axis 80.

Figure 5:
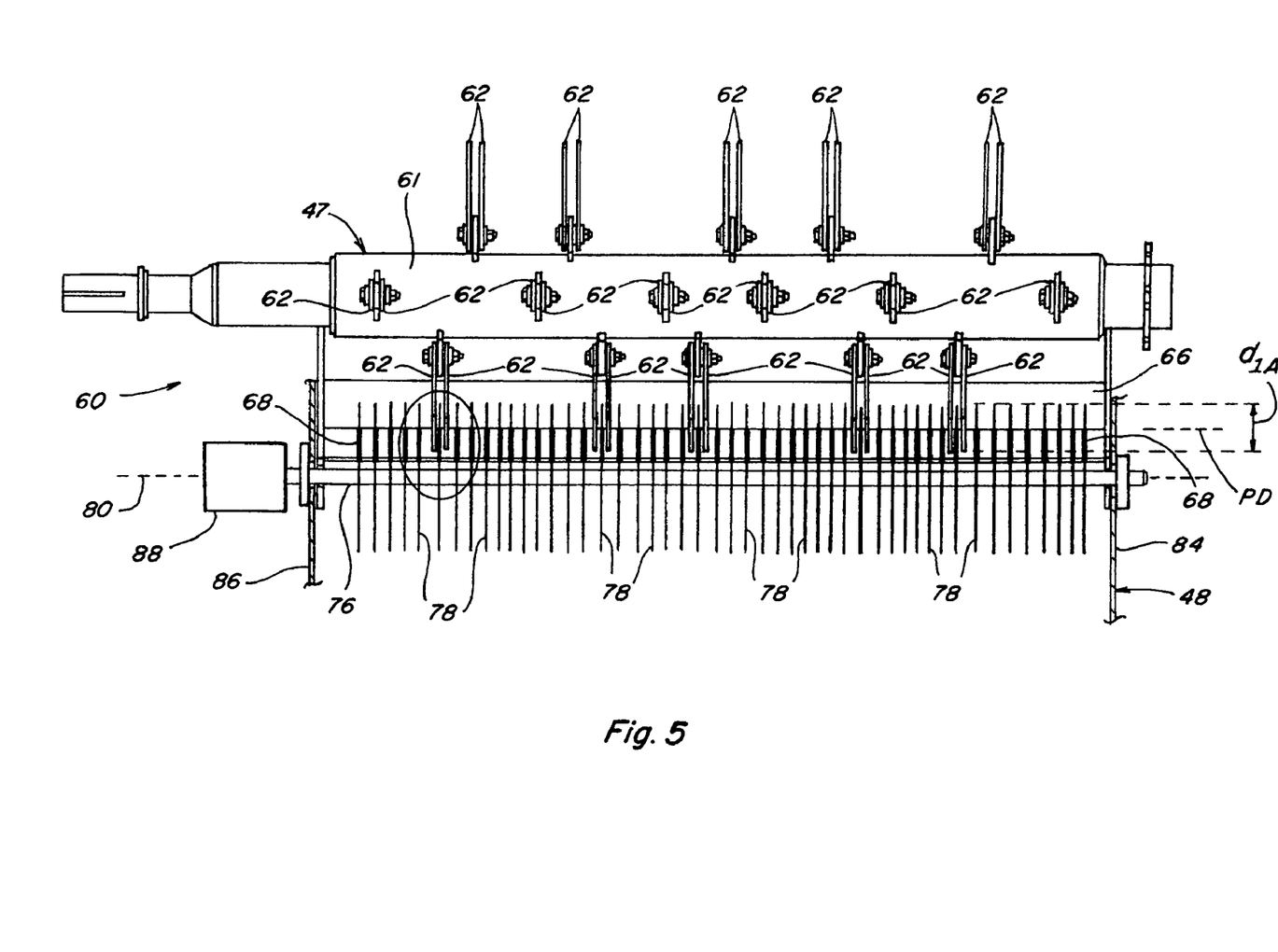
FIG. 5 is a simplified rear plan view of various portions of the chopper assembly of FIGS. 3 and 4, generally at cut Y-Y in FIG. 4, generally illustrating the cooperative interengagement of the knife blades of the rotary chopper element with the knife elements of the rotatable shaft as the rotatable shaft is rotated to rotatably move such knife elements through the slots in the grate portion of the chopper grate assembly.
Figure 5A:
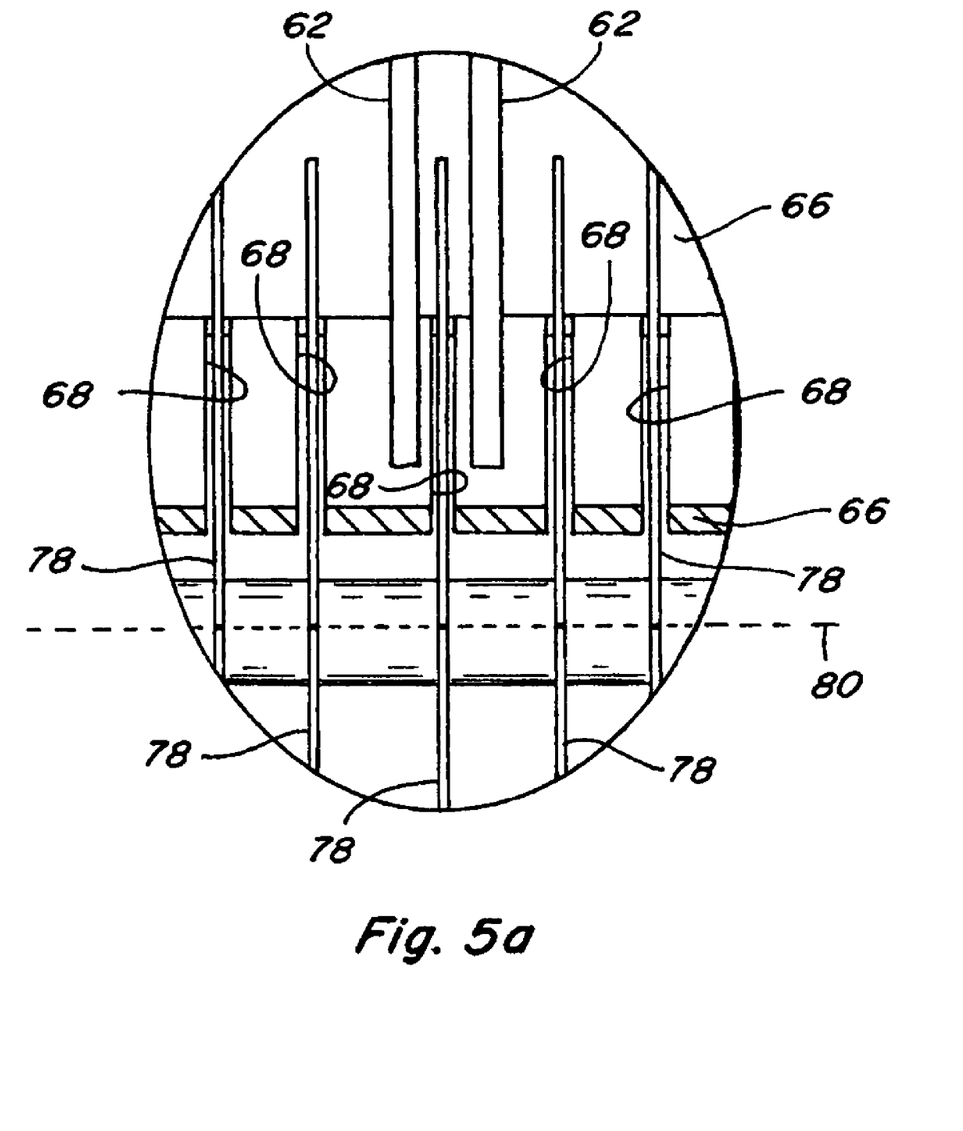
FIG. 5a is an enlarged view of a portion of the chopper assembly of FIG. 5 as circled in FIG. 5, showing in greater detail the relationship of certain components of such chopper assembly.

In the embodiment depicted in FIGS. 3-4, the chopper grate assembly 46 includes a concave pan assembly 82 that has opposed sides 84 and 86, with rotatable shaft 76 mounted to extend in a journaled arrangement between the opposed sides 84 and 86 at a fixed distance from grate portion 66. Due to the coordinate sizing and configurations of the knife elements 78 and the slots 68, as the rotatable shaft 76 is rotated about the rotatable shaft axis 80, the knife elements 78 are moved and project through the slots 68. Slots 68 and knife elements 78 are appropriately positioned relative to knife blades 62 of rotary chopper element 47 to permit the knife elements 78 and knife blades 62 to be interengagable with one another, especially as rotatable shaft 76 is caused to rotate counter to the rotation of rotary chopper element 47, so as to pass adjacent to one another without contacting one another. Such interengagable movement is illustrated in FIG. 5, which is a view generally, but not totally, along cut Y-Y in FIG. 4, with certain elements within a circled portion of such figure being shown in an enlarged view in FIG. 5A, wherein such knife blades 62 and knife elements 78 are shown so mounted as to interengage with one another during a chopping operation without contacting or interfering with one another.

A drive mechanism 88 is operatively connected to rotatable shaft 78 to operably rotatably drive rotatable shaft 76 about its rotatable shaft axis 80. Preferably, such drive mechanism, which may take any of numerous forms of well known construction and operation, including, by way of example only and not of limitation, electrical or hydraulic motors, and which may have associated therewith various belt, pulley, gear, or transmission systems for effecting the movement desired of the rotatable shaft 76, will be controllable, such as by an operator or through an automated system, to permit the speed or direction of rotation, or both, of the rotatable shaft 76 to be varied as might be considered desirable under all pertinent conditions.

Among other things, the type of crop being harvested, the size of the crop residue being introduced into the chopper assembly 46, the speed with which such crop residue is introduced, and the rotational speed of the rotary chopper element 47 all influence the throughput speed of the crop residue and the chop quality that can be realized. The positioning of a counter knife assembly in a stationary position across the crop residue passageway 70 allows for some control over the chop quality, provided sufficient throughput speed can be maintained. The active counter knife assembly 60 of the present invention provides the ability to better control both quality and throughput speed.

If, for a given set of circumstances, the chop quality is considered to be of a nominal or standard quality when the rotary chopper element 47 is rotated in its standard forward direction and the rotatable shaft 76 is held fixed and non-rotating, similar to what would be the case if a stationary knife assembly were employed, the chop quality would then typically be finer when the rotatable shaft 76 is rotated counter to the rotation of the rotary chopper element 47. In such instances, the throughput speed may become somewhat slower. If the rotatable shaft 76 is rotated in the same direction as the rotation of the rotary chopper element 47, the throughput speed can generally be increased, though perhaps at some expense to the chop quality. If both the rotary chopper element 47 and the rotatable shaft are rotated in the same tangential direction at the same linear tangential speed, little or no chopping will be effected, but the crop residue will be advanced rapidly through the passageway 70. Generally the greater the linear tangential speed differential between the rotary chopper element 47 and the rotatable shaft 76, regardless of which is rotating faster, the finer the chop quality.

From the foregoing, it will thus be appreciated that the active counter knife assembly 60 of the present invention provides a construction that can be readily employed by a user to minimize or better clear residue buildup, to better control the throughput speed of crop residue through the chopper assembly 46 and the speed of residue flow therefrom towards the rear of the combine 20, and to better control the chop quality.

Figure 6:
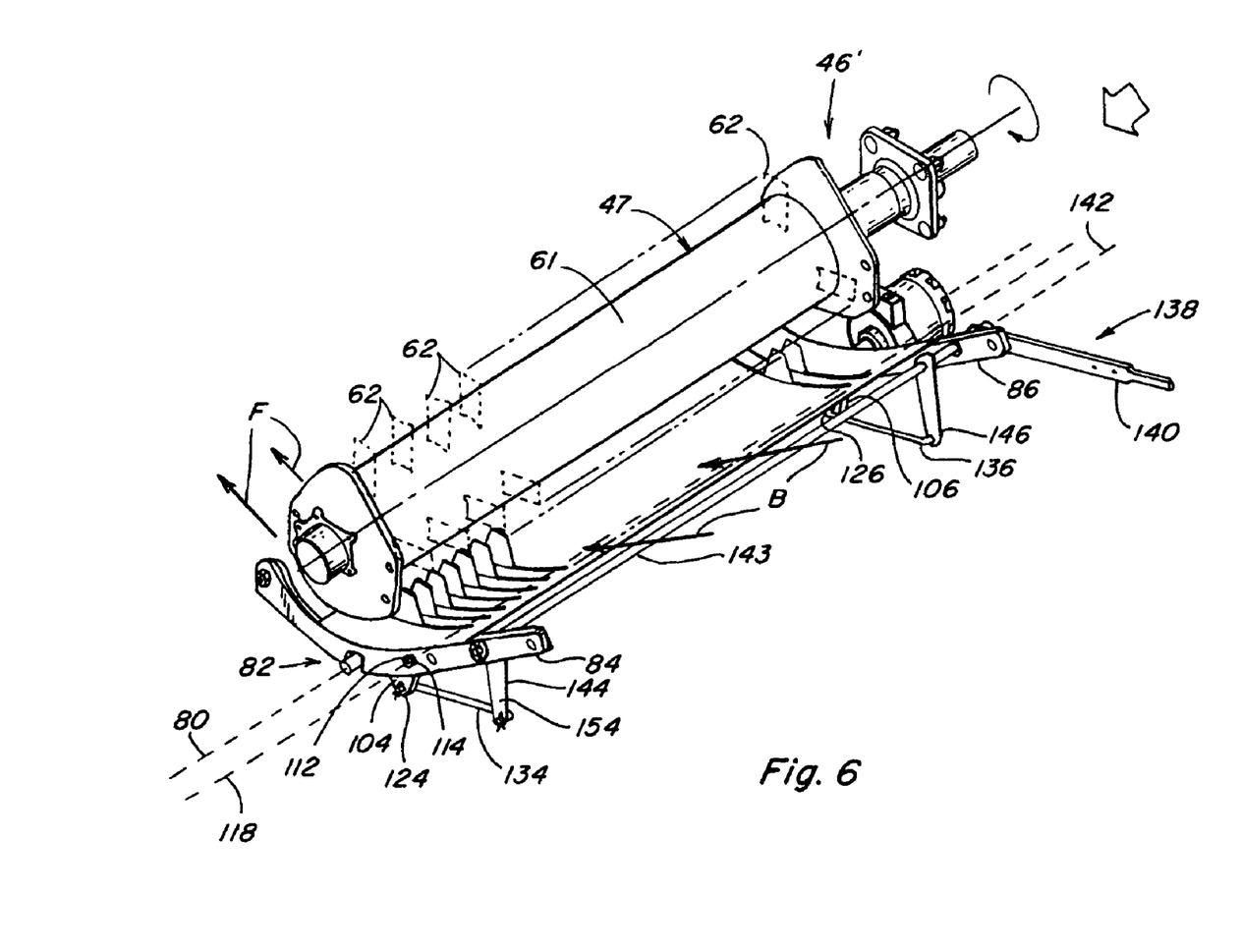
FIG. 6 is a simplified plan view similar in many respects to FIG. 3, but showing an alternative embodiment of an active counter knife assembly that includes an adjustment mechanism for adjusting the spacing between the rotatable shaft and the grate portion of the chopper grate assembly, wherein, for purposes of clarity, knife blades on the rotary chopper element of the chopper assembly are shown in dotted outline only and phantom lines along the central portions of the rotary chopper element and the grate assembly should be considered to include therealong various components, representative components of which are depicted to the outer sides thereof.
Figure 7:
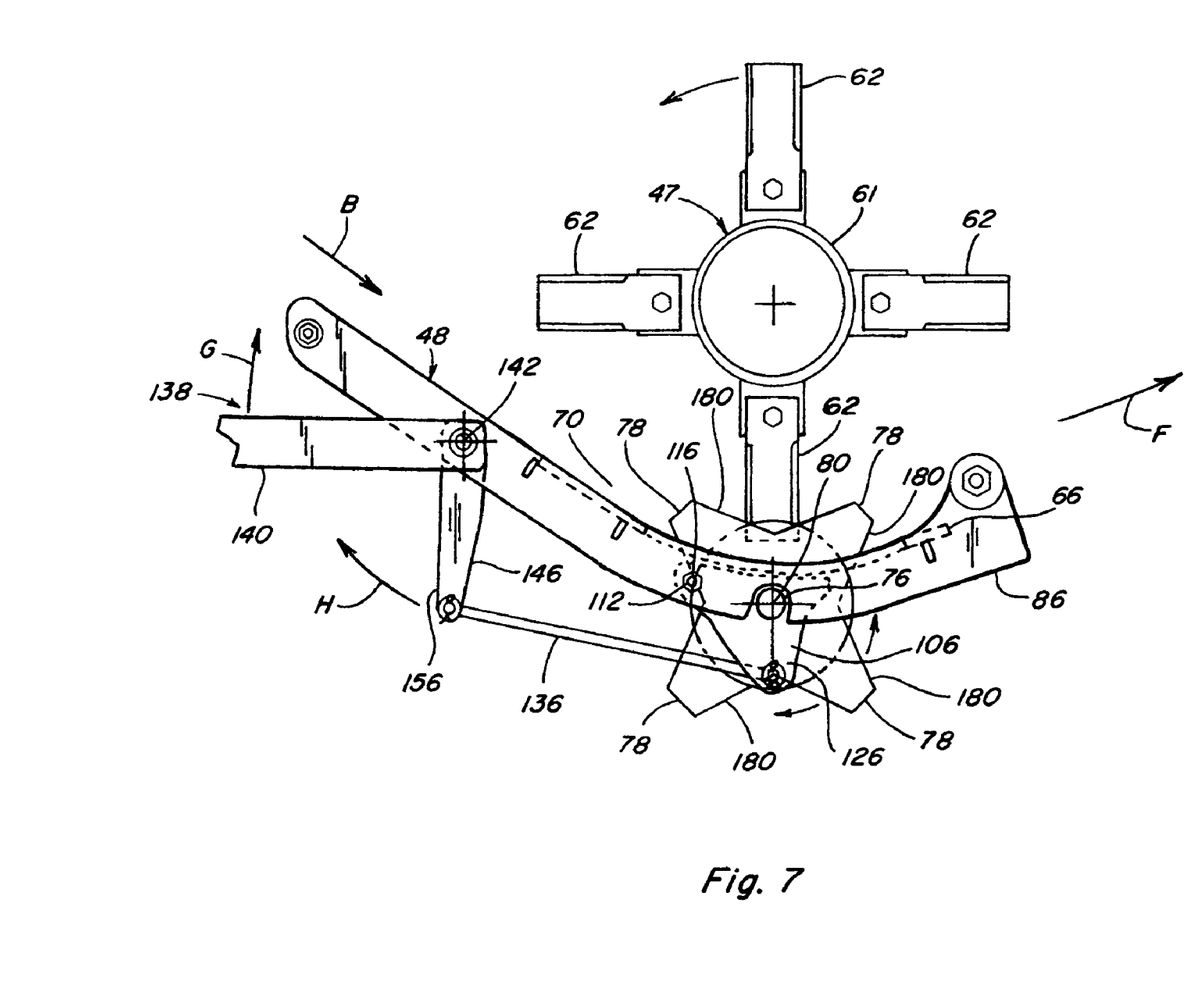
FIG. 7 is a simplified left side plan view, generally viewed from position Z in FIG. 6, of a portion of the chopper assembly of FIG. 6 with the active counter knife assembly thereof, wherein, for purposes of clarity, the drive motor in the foreground is shown in phantom only.

FIGS. 6-7, which correspond generally to FIGS. 3-4, depict an alternative embodiment of a chopper assembly 46' that allows still greater control and which includes an adjustment mechanism for adjustably varying the positioning of the rotatable shaft relative to the grate portion of the chopper grate assembly between a fully engaged position wherein the knife elements of the active counter knife assembly alignedly rotate through the slots of the grate portion of the chopper grate assembly at maximal projection and a fully retracted position wherein the knife elements project minimally, if at all, through the slots. In such embodiment, rotatable shaft 76 (FIG. 7), which is generally spaced from and parallel to both rotary chopper element 47 and grate portion 66, is shown mounted to extend in a journaled arrangement between first and second end plates 104 and 106 associated, respectively, with opposed ends 84 and 86 of concave pan assembly 82 (FIG. 6). As depicted in FIGS. 6 and 7, the first and second end plates 104 and 106 are secured to such opposed ends 84 and 86 of concave pan assembly 82 by swivel connectors 112 at swivel points 114 and 116 which are offset from the rotatable shaft axis 80, which swivel points 114 and 116 define an engagement positioning axis 118 (FIG. 6), sometimes hereinafter also referred to as swivel axis 118, about which the end plates 104 and 106 and the journaled rotatable shaft 76 can be rotated in an arc-like movement.

End plates 104 and 106 also include lower portions 124 and 126 operatively connected via respective positioning rods 134 and 136 to a lever assembly 138, which is operable to effect, through the coupled movement of positioning rods 134 and 136, a rotation of end plates 104 and 106 and the rotatable shaft 76 journaled thereto about swivel axis 118, the consequence of which is the retraction of the knife elements 78 from the flow passageway 70 (FIG. 7). Lever assembly 138 includes an operable lever 140 coupled at axis 142 to a rotatable connecting rod 143 (FIG. 6) extending between sides 84 and 86 of concave pan assembly 82, which connecting rod 143 is attached to support links 144 and 146. Support links 144 and 146 are respectively connected to positioning rods 134 and 136.

When lever 140 is operated, as denoted by arrow G in FIG. 7, support links 144 and 146 are caused to rotate thereby effecting rotational movement of end portions 154 and 156 of support links 144 and 146 about axis 142, as denoted by arrow H, consequent movement of positioning rods 134 and 136, and the resultant swiveling movement of end plates 104 and 106 about their respective swivel points 114 and 116 to effect a rotational movement of the assembly including end plates 104 and 106 and the rotatable shaft 76 journaled thereto about swivel axis 118. By thus operating, and then fixing the status of lever assembly 138 at a given position, a user can conveniently alter and fix the positioning of the rotatable shaft 76 relative to grate portion 66, thereby controlling to some extent the amount by which the knife elements 78 are allowed to project through slots 68 as rotatable shaft 76 rotates about its shaft rotation axis 80.

The ability to thus effect a repositioning of the rotatable shaft 76 relative to grate portion 66 is beneficial not only in circumstances where a user finds it desirable to be able to withdraw or retract the knife elements 78 of the active counter knife assembly 60 from the flow passage 70 such as to clear obstructions, but also in circumstances where the user wishes to adjust the quality of the chop or the throughput speed of the crop residue. When the rotary chopper element 47 is operating in its normal forward mode of operation and throughput speed will not be deleteriously impacted, such as may be the case with lighter crops, rotatable shaft 76 can be rotated counter to the rotation of rotary chopper element 47 and the positioning thereof adjusted to effect projection of knife elements 78 into the crop residue flow path through passageway 70 to better secure the quality of chop desired. Typically, the greater the amount of projection, the finer the chop, and the less the amount of projection, the courser the chop.

Conversely, if throughput speed, as opposed to chop quality, is a more paramount consideration, rotatable shaft 76 can either be positioned farther from grate portion 66, so that the knife elements will not project as far into passageway 70 and act to slow the speed of the crop residue flow therethrough, or rotated in the same direction as rotary chopper element 47, thereby typically increasing to some extent the speed of the crop residue flow through such passageway 70, with the amount of projection of the knife elements still permitting the user to exercise some control over both the throughput speed and the chop quality. Typically, for a given set of conditions, with both the rotary chopper element 47 and the rotatable shaft 76 being rotated in the same tangential direction, the greater the amount of projection of knife elements 78 into the passageway 70, the greater the throughput speed, and the lesser the amount of projection of knife elements 78 into the passageway 70, the slower the throughput speed.

For a given amount of projection of the knife elements 78 into the passageway 70, regardless of the amount of such projection, the linear tangential speed differential between the rotary chopper element 47 and the rotatable shaft 76 will affect both chop quality and throughput speed. Generally, for a given set of conditions, including rotational directions of the rotary chopper element 47 and the rotatable shaft 76 and a given amount of projection of the knife elements 78 into the passageway 70, the greater the differential, the finer the chop and the slower the throughput speed.

It will be understood and appreciated by those skilled in the art that, although the positioning rods 134 and 136 of the embodiment of FIGS. 6-7 are shown controlled by the operation of a lever assembly 138, various other mechanisms and devices could equally as well be utilized to control the positioning of positioning rods 134 and 136 or, more directly, the swivel positioning of end plates 104 and 106, or even the placement of rotatable shaft 76 closer or farther from grate portion 66. Such mechanisms and devices may be manually or automatedly operable, including remotely by a user, such as from the cab of a combine, and may include various and sundry systems and components of well known construction for effecting the desired movements, placements, or positionings.

Figure 8:
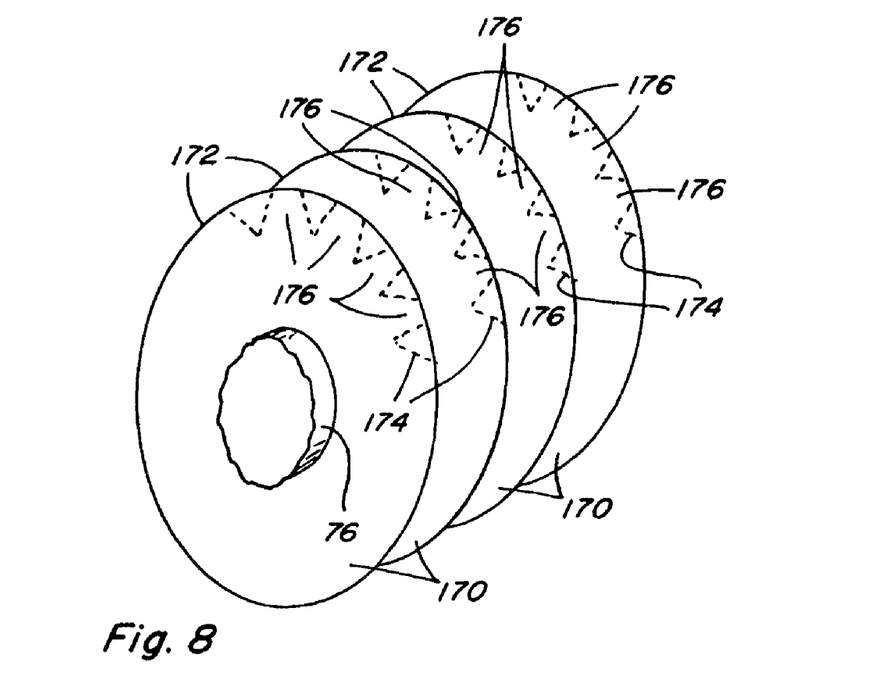
FIG. 8 is a perspective view of a portion of a rotatable shaft having knife elements in the form of banded blades mounted thereon.

Additionally, it should be apparent that the knife elements of the rotatable shaft can take many forms and be mounted or positioned along the shaft in various manners consistent with the present invention. By way of example only and not of limitation, the knife elements may be individual blade elements or prongs, banks of blade elements or prongs, or circular bands mounted or associated with the rotatable shaft for rotatable movement therewith. In such regard, FIG. 8 depicts a portion of a rotatable shaft having mounted therealong a plurality of circular blades 170, which blades may have a uniform outer periphery 172, as denoted in solid outline in FIG. 8, or may be formed or constructed to have a non-uniform periphery 174, as denoted in dotted outline in FIG. 8, such as to have a plurality of tooth-like projections 176 therearound.

Various factors may influence or play a role in the design or selection of the particular form of knife element desired. Different types of knife elements may be considered desirable depending upon the circumstances and conditions of use. In such regard, it should be recalled, as has been previously noted hereinabove, that rotatable shaft 76 can be held essentially fixed and non-rotating, considered herein to be the stationary operating mode of the active counter knife assembly 60, in which event the active counter knife assembly may function much as if it were a stationary knife assembly, or rotatable shaft 76 can be rotated counter to the direction of rotation of the rotary chopper element 47 of chopper assembly 46, considered herein to be the forward operating mode of the active counter knife assembly 60, such as to effect a finer chop of the crop residue transiting passageway 70 between the rotary chopper element 47 and the active counter knife assembly 60, or rotatable shaft 76 can be rotated in the same tangential direction as the rotary chopper element 47, considered herein to be the reverse operating mode of the active counter knife assembly 60, such as to secure a faster throughput of the crop residue through passageway 70 or to minimize further chopping off damage to the crop residue passing through such passageway 70. Especially in instances when a user desires to effect the passage of crop residue through passageway 70 with little or no additional chopping off damage to such transiting crop residue, it may be desired that the knife elements on the rotatable shaft 76 be so configured that, when the rotatable shaft 76 is rotated in the same tangential direction as the rotary chopper element 47, that is, when the active counter knife assembly 60 is operated in its reverse operating mode, and rotatable shaft 76 is being rotated at the same linear tangential speed as that of the rotary chopper element 47, the crop residue in the passageway can be moved through the passage without experiencing any appreciable further chopping by the knife elements on the rotary shaft.

One way in which the chopping activity of the knife elements on the rotatable shaft 76 can be so limited or minimized when active counter knife assembly 60 is being operated in its reverse mode with rotatable shaft 76 rotating at the same linear tangential speed as rotary chopper element 47 is by employing knife elements of such a design that they can advance the crop residue through the passageway 70 without effecting any appreciable further chopping thereof. One preferred design that can be readily utilized to obtain such effect employs knife elements that are or include individual teeth-like elements or projections, including individual blade elements or prongs or elements or projections such as the knife elements 78 of FIGS. 3-7 or the tooth-like projections 176 of FIG. 8, with the sides of the knife elements that serve to advance the crop residue through the passageway 70 when the active counter knife assembly 60 is being operated in its reverse mode being blunted or unsharpened. As best shown in FIGS. 4 and 7, with knife elements such as knife elements 78, one side 180 of knife elements 78 is preferably formed or configured to be blunt or unsharpened. For purposes of further discussion herein, since such sides 180 are the trailing sides of such knife elements 78 when the active counter knife assembly is operating in its forward mode of operation, sides 180 will hereinafter be referred to as trailing sides 180, although it will be appreciated that such trailing sides 180 effectively become leading sides when the active counter knife assembly is operating in its reverse mode of operation and the knife elements 78 are being moved through passageway 70.

With such types of knife elements 78, with blunt trailing sides 180, when the active counter knife assembly 60 is operated in its reverse mode, with rotatable shaft 76 rotating at the same linear tangential speed as rotary chopper element 47, the knife elements 78 will move through passageway 70 in uniformity with knife blades 62 on rotary chopper element 47 at essentially the same linear tangential speed, and the blunt or unsharpened trailing sides 180 of knife elements 78 will act to move the crop residue through such passageway, but, since such sides 180 are unsharpened, with minimal additional chopping of or damage to such crop residue.

Various other knife element designs and configurations may also be employed, depending upon the desires of users and particular conditions or factors of import to them In such regard, it should be understood that, within the spirit and scope of the invention, numerous variations in form and construction of the knife elements are contemplated and possible, and that the embodiments described and depicted herein are but a few examples of knife elements that may be employed.

With further reference to the various knife element designs and configurations that may be employed, however, it should be recalled, as has been noted hereinbefore, that it is sometimes desirable that the crop residue be advanced through the flow passageway 70 with little or no chopping activity. In such regard, it has been explained that, in general, such action can be best effected by adjusting the direction of rotation of the rotatable shaft 76 so that it will rotate in the same tangential direction as the rotary chopper element 47 and by also adjusting the speed of the rotatable shaft 76 so that the knife elements 78 on the rotatable shaft 76 and the knife blades 62 on the rotary chopper element 47 move through the flow passageway 70 at approximately the same linear speeds. When the rotatable shaft 76 and its knife elements 78 are so positioned that the knife elements 78 project through slots 68 sufficiently to interengage with the knife blades 62 on rotary chopper element 47, it is thus desirable that the linear speed of the knife elements 78 and knife blades 62 be the same.

In as much as the knife elements 78 and the rotary shaft upon which they are mounted may vary in size, extending outwardly from the rotatable shaft axis 80 to an effective counter knife shaft diameter, and knife blade 62 and rotary chopper element 47 are similarly variable in size, extending outwardly to an effective rotary element diameter, with linear speeds of such elements though the flow passageway 70 varying based upon both the rotational speeds thereof and the distances of portions of such elements along the effective counter knife shaft diameter or the effective rotary element diameter, and since the effective diameters may differ from one another in various embodiments and with various constructions, a total matching of linear speeds along the entireties of such effective diameters is not generally achievable. As a consequence, it has been found advisable that, in attempting to achieve a no-chop or near no-chop condition or status, the linear speeds be matched, to the extent practical, within a given area in or along a given line through the flow passageway 70 between the rotatable shaft 76 and the rotary chopper element 47.

In such regard, for purposes of further discussion and explanation herein, the overlap of knife elements 78 and knife blades 62, as they interengage with one another, is considered to define a interaction zone, having a height defined as the distance of interaction, denoted by $d_{IA}$ in FIG. 5, as measured along a line transverse to and extending between the rotatable shaft axis 80 and the axis of rotation of rotary chopper element 47. It has been noted that, by adjusting the rotational speed of the rotatable shaft 76 such that the linear speeds of the knife elements 78 on rotatable shaft 76 and the knife blades 62 on rotary chopper element 47 are made approximately equal along a line through the midpoint of the interaction zone, that is, at a midpoint line through $d_{IA}$, denoted in FIG. 5 as throughput line PD, a condition can be realized that exhibits little, if any, additional chopping of the crop residue transiting flow passageway 70. Such throughput line PD may sometimes be considered to correspond to or to define the pitch diameter of the rotatable shaft 76 with knife elements 78 mounted thereon.

Since, especially with the embodiment of FIGS. 6-7, the rotatable shaft 76 may be repositionable relative to grate portion 66, and thus also relative to rotary chopper element 47, the interaction zone and its height distance of interaction $d_{IA}$ may also be subject to change, thereby affecting the linear speed considered most desirable for effecting a no-chop condition. In such regard, however, it has been noted that acceptable no-chop results may generally be achieved so long as the linear speeds of the knife elements 78 and knife blades 62, though perhaps not perfectly matched at throughput line PD, are established or maintained to be approximately equal to one another within the distance of interaction $d_{IA}$, up to the outer diameters of either the rotatable shaft 76 and its knife elements 78 or the rotary chopper element 47 and its knife blades 62. In light thereof, any references to or discussions herein of the desirability of establishing or maintaining the same linear speeds of the knife elements 76 and knife blades 62 to obtain a no-chop condition should be treated and considered as seeking the establishment or maintenance of linear speeds of knife elements 78 of rotatable shaft 76 and knife blades 62 of rotary chopper element 47 that are approximately equal to one another within the distance of interaction $d_{IA}$, up to the outer diameters of either the rotatable shaft 76 and its knife elements 78 or the rotary chopper element 47 and its knife blades 62. In terms of the discussions herein, although some limited additional chopping of the crop residue transiting the flow passageway 70 may thus occur under such conditions, the establishment or maintenance of such approximate speeds should be considered sufficient to effect a no-chop condition as that term is employed herein or that condition is referenced or discussed.

Furthermore, especially in view of the variety of knife elements that could be employed with the present invention and the various manners in which such knife elements could be attached to the rotatable shaft, it should also be understood that the rotatable shaft, which has been depicted in the various figures herewith as a generally circular or tube-like shaft, could equally as well be a square or hexagonal shaft or have some other cross-sectional configuration to facilitate the easy mounting or distribution of knife elements therealong.

Although the active counter knife assembly of the present invention has been described and discussed relative to its use with residue chopper assemblies of an agricultural combine, its use need not be limited to such applications, and it should be understood that such counter knife assembly could also be readily and conveniently incorporated into or utilized with chopper assemblies in other applications and for other uses, consistent with the disclosures herein and within the spirit and scope of the invention.

In light of all the foregoing, it should thus be apparent to those skilled in the art that there has been shown and described an active counter knife assembly for a chopper assembly, which active counter knife assembly provides a user with the ability to better minimize or clear material residue buildup, to better control the throughput speed of the material residue at the chopper assembly and the speed of the material flow from the residue chopper assembly towards the rear of the combine, and to better control the chop quality of the chopper assembly. However, it should also be apparent that, within the principles and scope of the invention, many changes are possible and contemplated, including in the details, materials, and arrangements of parts which have been described and illustrated to explain the nature of the invention.

Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A method of controlling throughput speed and chop quality of a rotary chopper that includes a rotary chopper element extending laterally across a material supply path with a plurality of knife blades mounted thereon, the method comprising providing an active counter knife assembly for such rotary chopper, said active counter knife assembly including
a chopper grate assembly having a grate portion mounted generally parallel to the rotary chopper element across the material supply path to define a material flow path between said grate portion and the rotary chopper element, said grate portion including a plurality of spaced slots therealong, said slots extending generally transversely across the grate portion in general alignment with the direction of material flow along the material flow path,
a rotatable shaft, having a shaft rotation axis therethrough, positioned generally beneath and parallel to said grate portion and having a plurality of knife elements mounted thereon at positions generally alignable with said slots of said grate portion, said rotatable shaft rotatably movable about its shaft rotation axis,
said knife elements of said rotatable shaft and said slots of said grate portion being coordinately sized to permit said knife elements to project and move through said slots as said rotatable shaft is caused to rotate about its shaft rotation axis,
a drive mechanism operatively connected to said rotatable shaft and operable to rotatably drive said rotatable shaft about its shaft rotation axis,
operating said drive mechanism to rotate said rotatable shaft about its shaft rotation axis in a desired direction at a desired speed,
wherein said chopper grate assembly further includes a concave pan construction with opposed sides,
wherein said grate portion extends between said opposed sides of said concave pan construction,
wherein said adjustment mechanism includes first and second end plates,
wherein said rotatable shaft is connected extending between said first and second end plates for journaled rotatable movement about said shaft rotation axis,
wherein said first and second end plates are connected to respective ones of said opposed sides of said concave pan construction at respective swivel points, said swivel points defining an engagement positioning axis for said end plates offset from and generally parallel to said shaft rotation axis,
wherein said adjustment mechanism is operable to effect swiveled movement of said first and second end plates and said rotatable shaft extending therebetween about said engagement positioning axis,
whereby the position of said rotatable shaft relative to said grate portion of said chopper grate assembly is variably adjustable,
the method further including operating said adjusting mechanism to position said rotatable shaft to a desired position relative to said grate portion of said chopper grate assembly.

* * * * *